US007802955B2

(12) United States Patent
Jatzke

(10) Patent No.: US 7,802,955 B2
(45) Date of Patent: Sep. 28, 2010

(54) DOWEL FOR INSERTION INTO AN OPENING OF A WALL, IN PARTICULAR ON A VEHICLE BODY

(75) Inventor: Stefan Jatzke, Ebertsheim (DE)

(73) Assignee: TRW Automotive Electronics & Components GmbH, Radolfzell (DE)

( * ) Notice: Subject to any disclaimer, the term of this patent is extended or adjusted under 35 U.S.C. 154(b) by 0 days.

(21) Appl. No.: 12/074,920

(22) Filed: Mar. 7, 2008

(65) Prior Publication Data

US 2008/0226412 A1  Sep. 18, 2008

(30) Foreign Application Priority Data

Mar. 12, 2007 (DE) .................. 20 2007 003 635 U

(51) Int. Cl.
*F16B 19/00* (2006.01)

(52) U.S. Cl. .................. 411/508; 411/82.5; 411/908; 411/542; 24/297

(58) Field of Classification Search .................. 411/508, 411/85.5, 900, 901, 542; 24/297
See application file for complete search history.

(56) References Cited

U.S. PATENT DOCUMENTS

| RE30,326 E * | 7/1980 | van Buren, Jr. ............ 220/326 |
| 4,363,420 A | 12/1982 | Andrews |
| 5,314,280 A * | 5/1994 | Gagliardi et al. ............ 411/182 |
| 5,636,953 A | 6/1997 | Jaeger et al. |
| 5,852,854 A | 12/1998 | Pierrot et al. |
| 5,937,486 A * | 8/1999 | Bockenheimer ............ 24/297 |
| 6,244,805 B1 * | 6/2001 | Everard ...................... 411/182 |
| 6,319,436 B1 | 11/2001 | Jaeger et al. |
| 7,048,486 B2 * | 5/2006 | Schaty ....................... 411/508 |
| 7,198,315 B2 * | 4/2007 | Cass et al. .................... 296/29 |
| 2004/0057812 A1 * | 3/2004 | Schaty ........................ 411/508 |

FOREIGN PATENT DOCUMENTS

| DE | 3100498 | 1/1982 |
| DE | 19709857 | 11/1997 |
| DE | 19724656 | 12/1997 |
| DE | 69600896 | 11/1998 |
| DE | 10231274 | 1/2004 |
| DE | 69816745 | 5/2004 |
| EP | 0733558 | 9/1996 |
| EP | 1394420 | 3/2004 |

\* cited by examiner

*Primary Examiner*—Gary Estremsky
(74) *Attorney, Agent, or Firm*—Tarolli, Sundheim, Covell & Tummino LLP

(57) ABSTRACT

A dowel for insertion into an opening (12) of a wall (14), in particular on a vehicle body, has a shank section (16) which extends through the opening (12) in an inserted state and a flange (18) adjoined thereto and made of a first material component, and a sealing section (20) made of a second material component. The second material component is a plastic material which expands at an elevated temperature and tightly closes the opening (12) in the expanded state.

13 Claims, 1 Drawing Sheet

DOWEL FOR INSERTION INTO AN OPENING OF A WALL, IN PARTICULAR ON A VEHICLE BODY

TECHNICAL FIELD

The invention relates to a dowel for insertion into an opening of a wall, in particular on a vehicle body.

BACKGROUND OF THE INVENTION

DE 102 31 274 A1 shows a dowel with a sealing section which is configured as a ring and disposed on the underside of the flange facing the wall. The sealing section is made of an adhesive which is capable of being brought into a free-flowing state by heating. After installation of the dowel the component provided with the dowel passes through a combustion chamber, whereby the adhesive is activated and the dowel is adhesively bonded to the wall and thereby sealed.

The invention provides a dowel which is distinguished by a particularly good sealing arrangement.

BRIEF SUMMARY OF THE INVENTION

According to the invention, a dowel for insertion into an opening of a wall, in particular on a vehicle body, has a shank section which extends through the opening in an inserted state and a flange adjoined thereto and made of a first material component, and a sealing section made of a second material component. The second material component is a plastic material which expands at an elevated temperature and tightly closes the opening in the expanded state.

In particular, the two-component dowel in accordance with the invention, whose first material component is configured as a hard material and whose second material component is configured as a soft material, is already inserted into the opening prior to a painting or KTL coating (KTL=cathodic dip painting) of an associated vehicle body part. The second material component expands at those temperatures that exist in the drying plant passed through upon painting or coating and thus provides for a reliable sealing of the opening. An additional component for the sealing, e.g., an O-ring or an integrally injection-molded TPE seal (TPE=thermoplastic elastomer) is not required. As compared to a conventional adhesive an expanding material offers the advantage that upon expansion it completely fills up any existing gaps between the dowel and the opening and thereby closes the opening really tightly. On account of the expansion of the material manufacturing tolerances may, moreover, be compensated for.

Preferably, the entire dowel is configured as a one-piece part. In particular, the sealing section is integrally embodied with the shank section. As compared to a dowel consisting of a plurality of separate parts this offers the advantage of an easier and faster manageability. The dowel is inserted into the opening of the wall as a whole in a single working step.

Preferably, the inner edge of the opening and the side of the wall facing away from the flange, hence the inner side of the wall with respect to the direction of insertion of the dowel, are sealed by the plastic material in the expanded state. Thereby, a particularly good, liquid-tight sealing is achieved.

Moreover, it may be provided for that in the expanded state the plastic material adhesively bonds the dowel to the wall. By means of this additional adhesive effect it is possible to use the dowel in round holes, the dowel being prevented from participating in a rotation when attaching, for example, a bumper to the body part by adhesively bonding the same to the sheet metal of the wall.

In a preferred embodiment the sealing section surrounds the shank section below the flange, hence at least partly in the region of the opening and on the side of the opening facing away from the flange.

In order to permit an attachment of, for example, a bumper to the body part, the flange and the shank section include a hole for a screw, in particular a plastic screw.

Moreover, at its end lying opposite the flange the shank section may include a center point which is, for example, configured in the shape of a cone, a truncated cone, a pyramid, or a truncated pyramid and which facilitates the insertion of the dowel in the opening.

In a preferred embodiment the dowel includes at least in the region of the opening a rectangular, in particular square cross section and is therefore particularly suited for being inserted into a square opening. As already mentioned, in particular with low screwing-in torques of the screws a use of the dowel in a round hole is, however, possible as well.

A plurality of latching elements configured as spring lugs may be disposed on the shank section. In particular, two mutually opposite latching elements are provided.

Preferably, the latching elements extend towards the flange, i.e., the free ends thereof point towards the flange. In the inserted state these free ends rest against the underside of the wall and thus serve to fix the dowel in the opening prior to the expansion of the second material component. In order to prevent the dowel from being pulled out of the opening, the latching elements are obliquely extended outwards, hence include an acute angle along with the longitudinal axis of the dowel.

According to the preferred embodiment the latching elements at least partly cover the sealing section on the outside. Hence, the sealing section is situated "radially" within the latching noses, which offers the advantage that upon expansion of the second material component the latching noses are, so to speak, locked in their extended position. Thereby, the dowel is effectively prevented from being pulled out against the direction of insertion.

BRIEF DESCRIPTION OF THE PREFERRED EMBODIMENT

Figure 1:
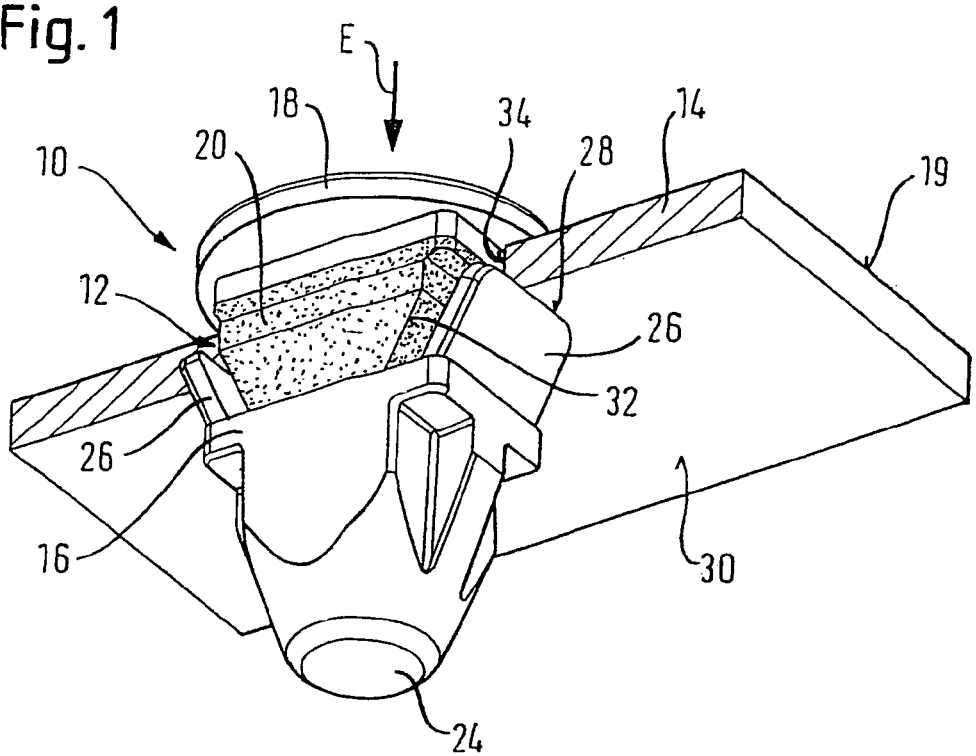
FIG. 1 shows a perspective view of a wall including an inserted dowel in accordance with the invention, partly in section.
Figure 2:
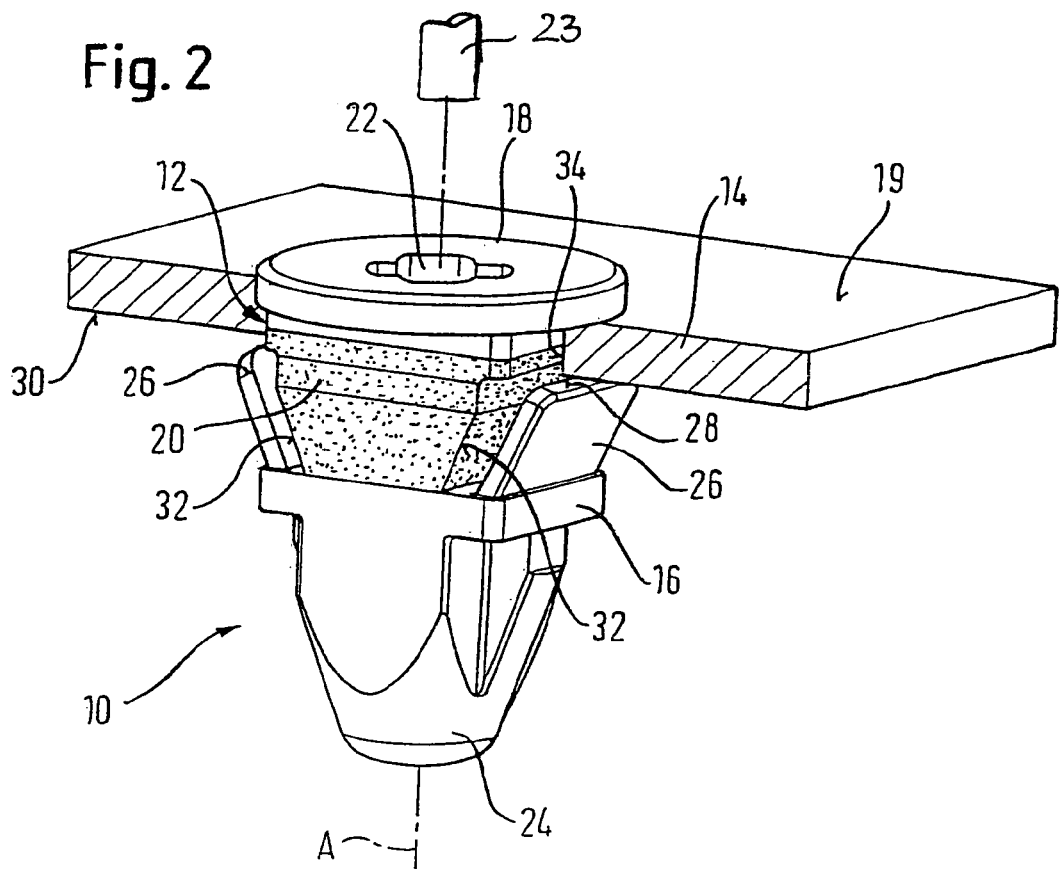
FIG. 2 shows a further perspective view of the wall including the inserted dowel of FIG. 1.

FIGS. 1 and 2 show a one-piece dowel 10 which is inserted into an opening 12 of a wall 14 which forms part of a vehicle body. The dowel 10 serves here for the liquid-tight attachment of, for example, a bumper to the body part. The dowel 10 has a shank section 16 which extends through the opening 12 in the inserted state and is adjoined by a circular flange 18 which is disposed on the outside 19 of the wall 14 with respect to the direction of insertion E of the dowel 10. The shank section 16 and the flange 18 are integrally produced of a first material component which is a hard material. In the region of the opening 12 the dowel 10 has a square cross section which is particularly suited for the insertion in a square hole.

Disposed almost directly below the flange 18 (with respect to the representation in the figures) is a sealing section 20 which completely surrounds the shank section 16 circumferentially at a specific height and is partly situated within the opening 12, partly below the opening 12. In the region of the sealing section 20 the shank section 16 has a cross section that is reduced by the thickness of the sealing section 20 as compared to the adjacent regions. The sealing section 20, which is embodied as a one-piece part with the shank section 16, consists of a second material component, namely a plastic material which expands at an elevated temperature and tightly closes the opening 12 in the expanded state. In the figures the non-expanded state of the second material component that is configured as a soft material is shown.

The flange 18 and the shank section 16 include a central hole 22 which extends along the longitudinal axis A of the dowel for receiving a screw 23, by means of which a bumper may, for example, be attached to the wall 14. A part of the screw 23 is schematically shown in FIG. 2. At its end lying opposite the flange 18 the shank section 16 has a center point 24 which is configured in this arrangement in the shape of a truncated cone.

Disposed on the shank section 16 at approximately half the height between the flange 18 and the center point 24 are a plurality of (in this case two) latching elements 26 which are configured as spring lugs and which extend obliquely outwards in a direction towards the flange 18. In the inserted state of the dowel 10 the free ends 28 of the mutually opposite latching elements rest against the inner side 30 of the wall 14. As apparent from the figures, the latching elements 26 extend across the entire height of that part of the sealing section 20 that protrudes from the opening 12, which means that the latching elements 26 largely cover the sealing section 20 on the outside on two sides. The sealing section 20, which lies on the inside with respect to the latching elements, includes two inclined outer surfaces 32 facing the latching elements 26.

Already prior to a painting or KTL coating of the vehicle body part formed by the wall 14 the dowel 10 is inserted into the opening 12 and locked into place by means of the latching elements 26. Upon painting or coating the vehicle body part passes through a drying plant, with the second material component, which forms the sealing section 20, expanding on account of the temperatures existing in the drying plant, thus sealing an inner edge 34 of the opening 12 and the inner side 30 of the wall 14 facing away from the flange 18. Dependent on the selection of the second material component various temperature ranges are conceivable for the expansion. In addition, in the expanded state the plastic material of the sealing section 20 adhesively bonds the dowel 10 to the wall 14. On account of the expansion of the sealing section 20 the latching elements 26 are, moreover, "locked" and thus prevented from a swiveling movement. In this manner a liquid-tight connection of the dowel 10 to the wall 14 is achieved. Subsequently, a bumper may, for example, be screwed to the dowel 10.

On account of the adhesive bonding which takes place upon expansion a use of the dowel 10 in round holes is possible as well, at least with low screwing-in torques of the screws.

The invention claimed is:

1. A dowel for insertion into an opening (12) of a wall (14) on a vehicle body, including
   a shank section (16) adapted to extend through the opening (12) in an inserted state,
   a radially extending flange (18) adjoined thereto, said shank section and said flange being made of a first material component, and
   a sealing section (20) made of a second material component,
   wherein said second material component is a plastic material which is unsealed with said opening (12) when in a non-expanded state and which expands at an elevated temperature and tightly closes the opening (12) in said expanded state, the opening (12) having an inner edge (34) and the wall (14) having a side (30) facing away from said flange when said shank section is in said inserted state, in said expanded state said second material component sealing only the inner edge (34) of the opening (12) and the side (30) of the wall (14) facing away from said flange (18), said second material component being spaced from a side (19) of the wall (14) facing toward said flange when in said expanded state,
   wherein a plurality of latching elements (26) configured as spring lugs are disposed on said shank section (16),
   wherein said sealing section (20) comprises at least one outer surface (32), said latching elements (26) at least partly cover said outer surface (32) of said sealing section (20).

2. The dowel according to claim 1, wherein said sealing section (20) is integrally embodied with said shank section (16).

3. The dowel according to claim 1, wherein in said expanded state said second material is adapted to adhesively bond said dowel (10) to said wall (14).

4. The dowel according to claim 1, wherein said shank section (16) includes a center point (24) on its end lying opposite said flange (18).

5. The dowel according to claim 1, wherein a portion of said dowel (10) has a square cross section adapted to be positioned in a region of said opening (12).

6. The dowel according to claim 1, wherein said latching elements (26) extend towards said flange (18).

7. The dowel according to claim 1, wherein said latching elements (26) at least partly cover said outer surface (32) of said sealing section (20) when said second component material is in said expanded state.

8. The dowel according to claim 1, wherein said sealing section (20) surrounds said shank section (16) below said flange (18).

9. The dowel according to claim 1, wherein said flange (18) and said shank section (16) include a hole (22) for a screw (23).

10. The dowel according to claim 1, wherein said latching elements (26) have a first position when said second material component is in said non-expanded state and a second position radially outward of said first position when said latching elements (26) are in said expanded state.

11. The dowel according to claim 10, wherein said second material component forces said latching elements (26) from said first position to said second position and locks said latching elements (26) in said second position when said second material component expands from said non-expanded state to said expanded state.

12. The dowel according to claim 1, wherein said latching elements (26) extend from said shank section (16) and are disposed radially outwardly of said outer surface (32) of said sealing section (20) when in the non-expanded and expanded states.

13. The dowel according to claim 1, wherein said latching elements (26) are made of the first material component.

* * * * *